US008817109B1

(12) United States Patent
Biagiotti et al.

(10) Patent No.: US 8,817,109 B1
(45) Date of Patent: Aug. 26, 2014

(54) TECHNIQUES FOR CAPTURING AND GENERATING A DVI SIGNAL

(71) Applicants: Advanced Testing Technologies, Inc., Hauppauge, NY (US); Eli Levi, Dix Hills, NY (US)

(72) Inventors: William Biagiotti, St. James, NY (US); Eli Levi, Dix Hills, NY (US); Peter F Britch, Miller Place, NY (US); David Howell, Smithfield, VA (US)

(73) Assignee: Advanced Testing Technologies, Inc., Hauppauge, NY (US)

( * ) Notice: Subject to any disclaimer, the term of this patent is extended or adjusted under 35 U.S.C. 154(b) by 0 days.

(21) Appl. No.: 14/040,788

(22) Filed: Sep. 30, 2013

Related U.S. Application Data

(60) Provisional application No. 61/838,615, filed on Jun. 24, 2013.

(51) Int. Cl.
*H04N 17/00* (2006.01)

(52) U.S. Cl.
USPC .......................................................... 348/181

(58) Field of Classification Search
CPC ........... G09G 5/39; H04N 5/45; H04N 17/00; H04N 17/004
See application file for complete search history.

(56) References Cited

U.S. PATENT DOCUMENTS

| | | | | |
|---|---|---|---|---|
| 6,396,536 | B1 | 5/2002 | Howell et al. | |
| 7,180,477 | B2 | 2/2007 | Howell | |
| 7,289,159 | B1 | 10/2007 | Biagiotti et al. | |
| 7,495,674 | B2 | 2/2009 | Biagiotti et al. | |
| 7,768,533 | B2 | 8/2010 | Biagiotti et al. | |
| 7,978,218 | B2 | 7/2011 | Biagiotti et al. | |
| 8,497,908 | B1 | 7/2013 | Biagiotti et al. | |
| 2006/0190632 | A1 * | 8/2006 | Yang et al. | 710/15 |
| 2007/0064110 | A1 * | 3/2007 | Biagiotti et al. | 348/180 |

* cited by examiner

*Primary Examiner* — Edward Martello
(74) *Attorney, Agent, or Firm* — Brian Roffe

(57) ABSTRACT

Method and modular system for generating and capturing DVI video signals. When generating a video signal, data blocks are arranged in a line parameter memory, each corresponding to a complete video line and containing pointers to specific entries for lines of the video signal in a primary image memory holding a main bit-mapped image, and a video line construct memory holding data enable and blanking patterns. Generation of the video signal is initiated by reading the line parameter memory and extracting pointers from the data blocks for a first line of the video signal being generated. Bits from the primary image and video line construct memories are obtained and combined based on extracted pointers to generate the first line of the video signal. A length of the first line of video signal is monitored to determine when it is complete, and then the process continues for each additional line.

20 Claims, 8 Drawing Sheets

GENERAL ARRANGEMENT

GENERAL ARRANGEMENT

DVI BLOCK DIAGRAM

DVI
MEMORY HIERARCHY

FRAME CREATION MEMORY ADDRESS COUNTER

FIG. 5 DYNAMIC OVERLAY

PIXEL TO COLOR LOOK UP TABLE W/SYNC

GENERAL ARRANGEMENT

TECHNIQUES FOR CAPTURING AND GENERATING A DVI SIGNAL

CROSS REFERENCE TO RELATED APPLICATION

This application claims priority of U.S. patent application Ser. No. 61/838,615 filed Jun. 24, 2013, which is incorporated by reference herein.

FIELD OF THE INVENTION

The present invention relates generally to the field of automatic test equipment for evaluating digital video interface (DVI) video electronic signals that are utilized by equipment under test by the automatic test equipment (also referred sometimes to as automated test equipment). More specifically, the present invention relates to DVI video signal generation and DVI video signal acquisition.

BACKGROUND OF THE INVENTION

Automatic test equipment for testing standard format video devices is known. It is commonly required to evaluate the performance and functionality of a video unit under test (UUT) to determine if the UUT is operating within the manufacturer's specifications, and/or within other desired specifications. Specifically, the UUT may require special image and scan formats.

DVI video signals can be generated by a wide variety of single purpose instruments employing diverse methods. In most available types, the image format and timing are limited to a set of known standards primarily to support commercial display devices. Similarly, single purpose instruments are available for the generation or acquisition of DVI video signals. Unifying the operation of these singular instruments is the responsibility of the operator.

OBJECTS AND SUMMARY OF THE INVENTION

It is an object of at least one embodiment of the present invention to provide a new and/or improved system having DVI video generating and processing capabilities on a single instrument or single card, primarily intended for use in automatic test equipment.

It is another object of at least one embodiment of the present invention to provide a new and/or improved system having DVI video acquisition and processing capabilities on a single instrument or single card, primarily intended for use in automatic test equipment.

It is yet another object of at least one embodiment of the present invention to provide one or more of these capabilities in either a standalone configuration or in unison with a full-featured video generation and acquisition instrument, such as the Advanced Testing Technologies Inc.'s Enhanced Programmable Video Generator and Analyzer (hereinafter referred to as "ePVGA", of the type disclosed, for example, in U.S. Pat. Nos. 6,396,536 and No. 7,289,159, both of which are incorporated by reference herein). As described, the ePVGA comprises multiple electronic modules integrated into a single instrument supporting the generation, acquisition and processing of composite video, raster video and stroke video and all of their analog and digital variants. This invention, a novel modification to this concept, leverages the complex circuit architecture already present in the instrumentation disclosed in '536 and '159 patents and adds, in a non-obvious manner, the relevant functionality of DVI video generation and acquisition in a daughterboard configuration. Due to modular design, this invention may also be packaged and operated as a standalone independent DVI test instrument.

In order to achieve one of these objects or another object, a first embodiment of a method for generating a static digital video interface (DVI) video signal in accordance with the invention includes providing a primary image memory (PIM) holding a main bit-mapped image, and a video line construct memory (DHV—Data enable/H sync/V sync) holding data enable and blanking patterns for lines of the video signal being generated, and arranging data blocks in a circular queue in a line parameter memory (LPM), each data block corresponding to a complete video line and containing pointers to specific entries in the PIM and the DHV. Generation of the video signal is initiated by reading the LPM and extracting the pointers from the data blocks for a first line of the video signal being generated. Bits from the PIM and DHV are obtained based on the extracted pointers and combined to thereby generate a first line of the video signal. A length of the first line of video signal being generated is monitored to determine when the first line of video is complete, and then generation of additional lines of the video signal continues by reading the LPM to extract the pointers from the data blocks for the additional lines of the video signal being generated, obtaining bits from the PIM and DHV based on the extracted pointers and monitoring the length of the additional lines to determine when each additional line of video is completed. This process may continue until there are no more lines of video to generate.

An additional, but optional step, is to control the formation of the DVI video signal by regulating the transfer of the combined bits from the PIM and DHV in order to provide uninterrupted video output. This may entail providing a line buffer for receiving the combined bits from the PIM and DHV, storing the combined bits in the line buffer for a period of time until the line buffer is full, then removing the stored combined bits from the line buffer, and then repeating the storing and removing steps.

Another additional, but optional step, is overlaying a stored dynamic image onto the static DVI video signal being generated. This may entail providing a vector store memory (VSM) with entries each holding information regarding the dynamic image, such as a line offset, pixel offset, overlay image pointer and priority for the dynamic image, reading each entry in the VSM and comparing the overlay line offset to a pending line of the primary image, and selectively activating the overlay image based on a relation between the overlay line offset and the pending line of primary image.

The additional steps may be performed in combination with one another or separately.

A method for capturing and automatically formatting digital video interface (DVI) video signals in accordance with the invention includes providing a single real-time capture module including at least three input channels for receiving the DVI video signals, and a corresponding number of color-specific memories, detecting presence of a DVI signal by using a vertical sync pulse to trigger a timed pulse indicative of vertical sync presence, storing captured DVI data relating to the video signals in separate color-specific memories, and automatically measuring parameters of the DVI signal including duration of an active image area on a video line, a total pixels per line, a total line time, a frame time, and a pixel clock frequency. The parameters are directed into data registers to enable retrieval and subsequent formatting of the video signals. Controlling software is then able to generate video signals from the data in the registers and color-specific memories.

An additional, but optional, step is to configure each color-specific memory as a two dimensional array in which each row corresponds to a single line of synchronized video and each column corresponds to a video sample.

Another additional, but optional, step is to store the horizontal signal, the vertical signal and the data enable signal in a memory separate from the color-specific memories.

Another additional, but optional, step is to detect a horizontal sync indicative of start of a new line, then increment an RGB data shared memory pointer to a start of the next memory block is assigned to the next video line, and repeat this process for each new line.

The additional steps may be performed in combination with one another or separately.

One embodiment of a video processing arrangement in accordance with the invention includes a host computer including a monitor, a video asset coupled to the computer for generating video signals, and an interface for connecting the video asset to the computer to enable the display of the video signals on the monitor. The video asset includes a plurality of primary elements including a primary composite video module for producing different types of a primary video signal and outputting the primary video signal via one or more output channels, a secondary composite video source module for producing a secondary composite video signal and outputting the secondary composite video signal via one or more output channels, a digital video interface (DVI) module for producing different types of DVI video signals and outputting the DVI video signals via one or more output channels, a stroke generator module for generating a stroke XYZ video signal and outputting the stroke video signal via output channels, a real time capture module for capturing video signals in a plurality of different modes including composite, stroke, raster and DVI video, and a common distributed time base module for generating and distributing clock signals to all of the primary elements. The secondary video source module is configured to produce the secondary composite video signal in an identical or different format than the primary video signal and different than the primary video signal. The primary elements are preferably autonomous or autonomously operational such that each primary element does not share components with other of the primary elements aside from the interface and the distributed time base module to thereby enable each primary element to act as a stand-alone instrument and all of the primary elements to act simultaneously.

The video asset may be a single instrument adapted for insertion into a single slot of the host computer. The real time capture module may be configured to read back a captured, fully formatted image for analysis or redisplay. The video asset may include a serial data interface for connecting each primary element together and to the interface. The real time DVI video acquisition module and the DVI video generation module may physically exist within the same instrument, or in the alternative, physically exist within separate instruments that are utilized together, and, when utilized together, constitute the same functionality as the single instrument with both modules. The DVI video acquisition module and DVI video generation module may be configured on a daughterboard attached to the main video asset, or arranged in a separate independent instrument.

An arrangement for generating digital video interface (DVI) video signals in accordance with the invention includes a primary image memory (PIM) module that operatively holds a main bit-mapped image, a static (DHV) memory module that operatively holds information regarding the video format being generated, such as data enable and horizontal and vertical sync signal patterns for all lines in the video format being generated, and a dynamic overlay memory (DOM) module that operatively holds at least one overlay image and a list of offsets that determine a changing location of the overlay image on a frame by frame basis. The DOM module has a memory space divided into a series of blocks, each of which contains a bit-mapped image. The arrangement also includes a vector store memory (VSM) module that operatively holds information regarding the overlay image, such as offsets, overlay pointer and priority for the overlay image, a line parameter memory (LPM) module organized as a preferably circular queue of data blocks, each of which corresponds to a complete video line and contains pointers to row entries in the PIM and DHV modules, and a master frame controller coupled to the PIM module, the DOM module, the DHV module, the VSM module and the LPM module. A video stream assembler is also provided and creates a frame of video line by, for example, extracting pointers from the data blocks in the LPM module for the current line, retrieving data from the PIM and DHV modules based on the pointers extracted from the LPM module, extracting pointers for an overlay image from the VSM module, and retrieving data from the DOM module based on the pointers extracted from the VSM module.

This arrangement may also include a line buffer memory in which data from the video stream assembler is stored, and an output formatter that receives an image stream from the line buffer memory and calculates an R-G-B byte representation for each pixel using an internal color lookup table. A low voltage differential signaling transmitter constructs the video signals based on data provided by the output formatter.

BRIEF DESCRIPTION OF THE DRAWINGS

The following drawings are illustrative of embodiments of the invention and are not meant to limit the scope of the invention as encompassed by the claims.

DETAILED DESCRIPTION OF PREFERRED EMBODIMENTS

Figure 1:
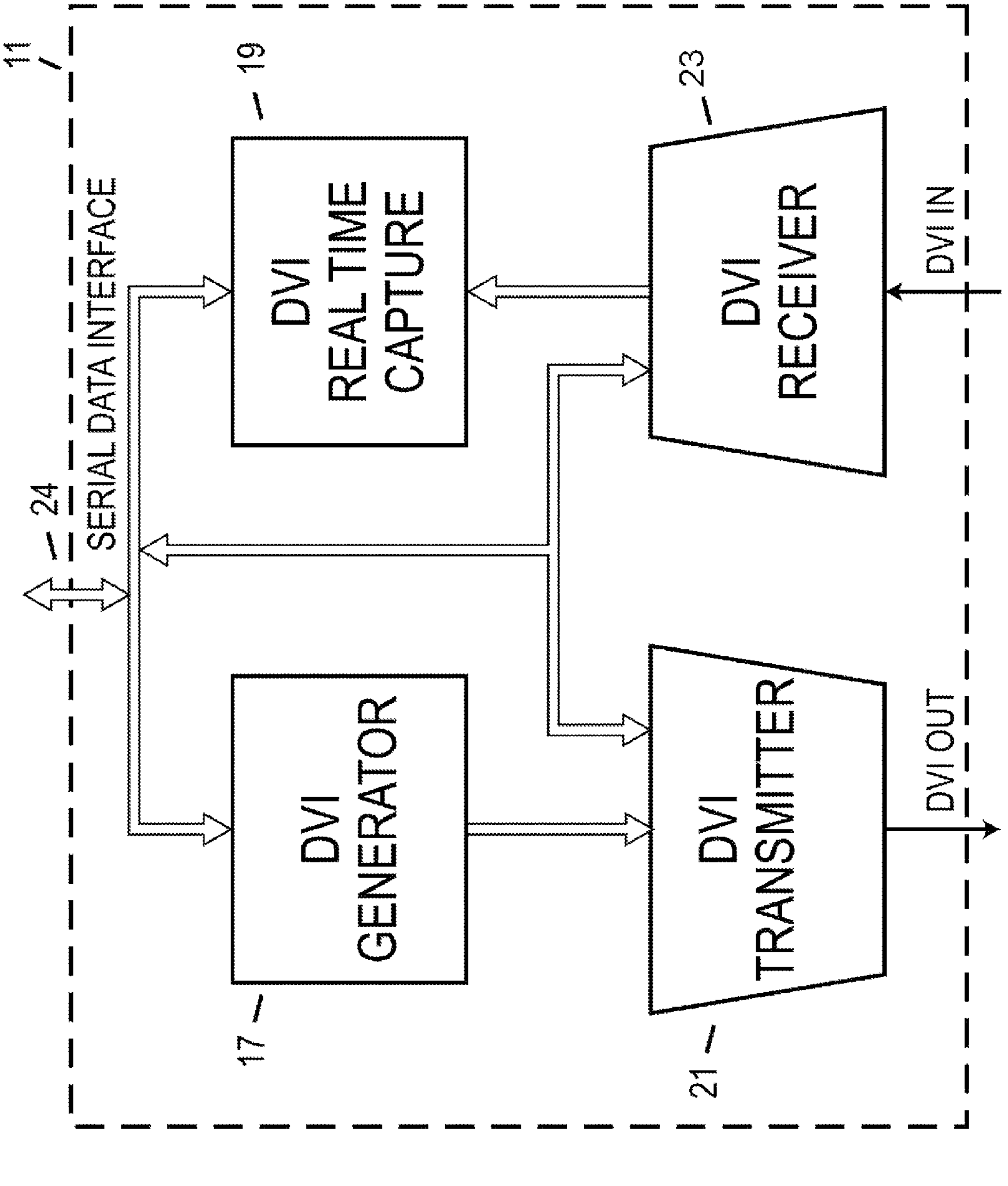
FIG. 1 shows an exemplifying embodiment of a general arrangement of a DVI video generation element and a DVI video acquisition element in accordance with the invention.

A Video Asset (AVA) is disclosed and is an electronic instrument for use in particular, in automatic test equipment.

The AVA comprises or consists of two major elements as follows:

1. DVI Video Signal Generator; and
2. DVI Video Signal Acquisition Module

Additional, optional elements may also be present. Preferred embodiments of the invention will be described with reference to FIGS. 1-8 wherein like reference numerals refer to the same or similar elements.

A. General Arrangement

The general arrangement of the video asset is shown in FIG. 1 and is designated generally as 11. All communication is implemented via a Serial Data Interface (SDI) 24. The SDI 24 facilitates communication between a controlling module (external to this embodiment, and not shown) and each of a plurality of primary elements that include a DVI generator 17, a DVI transmitter 21 coupled to and receiving signals from the DVI generator 17, a DVI Real Time Capture or acquisition module 19 and a DVI receiver 23 that is coupled to and provides signals to the DVI Real Time Capture module 19. Thus, there can be direct communications between the controlling module and each of the DVI generator 17, the DVI transmitter 21, the DVI Real Time Capture module 19 and the DVI receiver 23. From the DVI transmitter 21, the DVI out is directed, and the DVI in signal is provided to the DVI receiver 23.

Video asset 11 may be configured as a standalone independent DVI test instrument. Thus, it may be configured on a printed circuit board and include the components shown in FIG. 1. Necessary connectors and other electrical hardware needed to implement the functionality of the primary elements 17, 19, 21 and 22 would be readily apparent to one skilled in the art and is not shown. Also, the construction of the primary elements 17, 19, 21 and 22 would be readily known to those skilled in the art and are not described in detail. Various different constructions of these primary elements are available and the invention is not limited to any particular construction of a primary element.

Use of a serial data interface 24 reduces printed circuit board complexity and minimizes the possibilities for hostile crosstalk. For the described, preferred embodiment, the SDI 24 is a 6 wire (clock, strobe 4 bi-directional data) high-speed bus. For each data transfer, the SDI 24 preferably utilizes a 48-bit string organized as follows:

4 bit ID code—addresses one of the primary elements 8 bit Header—establishes type of transfer within the addressed primary element; read or write to a register, read or write to a specific asynchronous RAM, read or write to a specific synchronous RAM, or read or write to a specific dynamic RAM.

20 bit Address—points to a specific register, or is physical address for the specified RAM 16 bit Data—read or write data to the above addressed memory element DVI Generation FIGS. 2-6 show a general arrangement of an exemplifying embodiment of the DVI generator 17 in accordance with the invention. At the core of the DVI generator 17 is a series of memories that hold the various components of the DVI video signal and all required ancillary signals. These memory components include:

Primary Image Memory (PIM) module 28—a high density memory which holds the main bit-mapped image. In a preferred embodiment, the PIM module 28 is organized so that a video line corresponds to a half row in memory with each entry in the PIM representing two pixels.

Dynamic Overlay Memory (DOM) module 30—a high density memory which holds at least one and preferably a series of overlay images and a list of offsets that determine the changing location of the overlay image on a frame by frame basis. The DOM module's memory space is divided into a series of blocks, i.e., a plurality of blocks, each of which contains a bit-mapped image. More generally, the DOM module 30 holds information regarding the overlay image necessary to enable its generation.

DHV Memory module 32—a medium density static memory which holds the data enable and horizontal and vertical sync signal patterns for all of the lines in the video format being generated. The memory module is preferably organized as a series of rows, each of which holds sync and data enable signals for a complete video line. More generally, the DHVmemory module 32 holds information regarding the video format being generated.

Vector Store Memory (VSM) module 34—a medium density static memory that holds the offsets, overlay pointer and priority for the overlay that is active, for the current frame.

Figure 3:
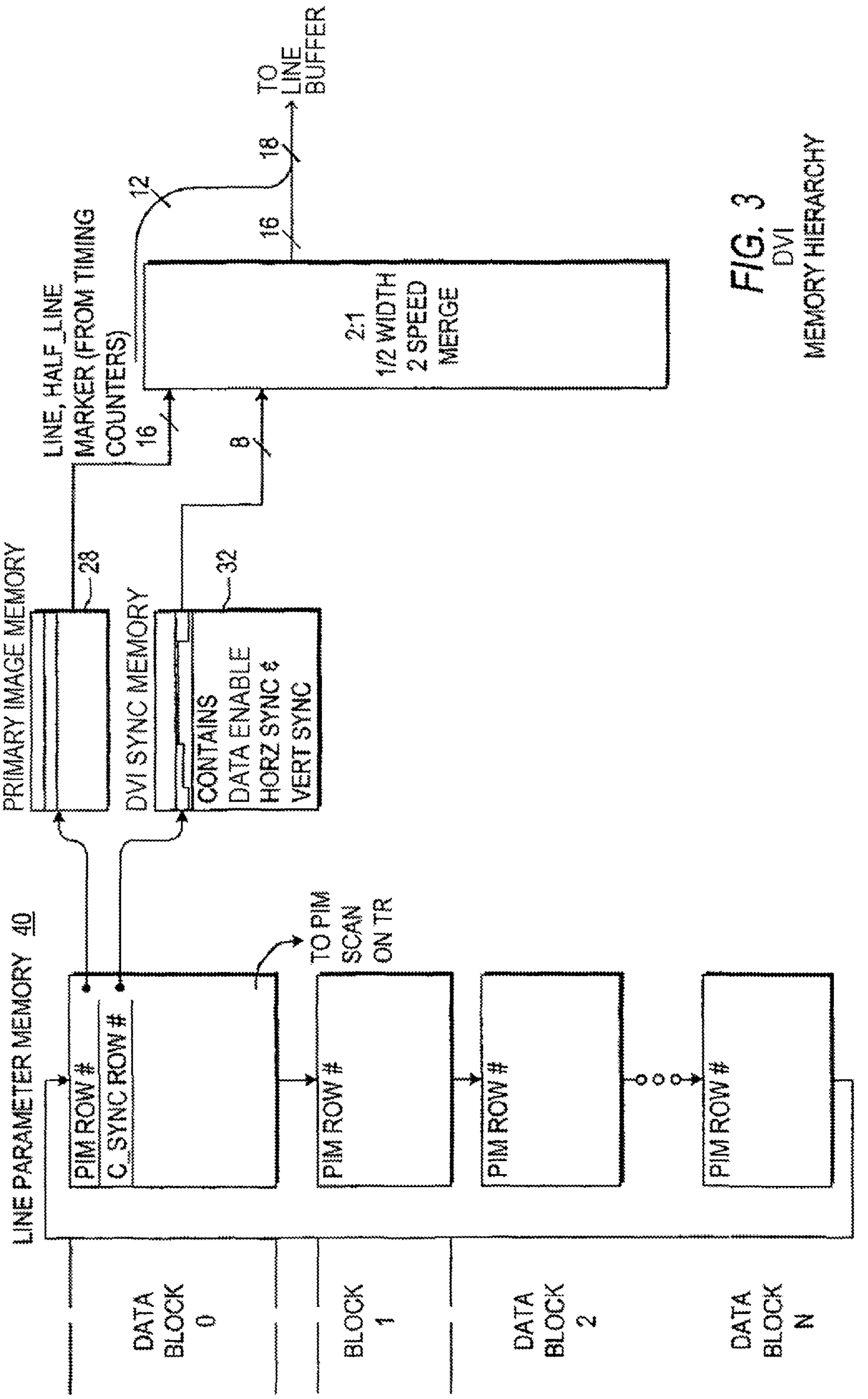
FIG. 3 shows the memory hierarchy of the DVI video generation element of the video asset in accordance with the invention.

Another static memory, the Line Parameter Memory (LPM) module 40 is located one step up in the conceptual control hierarchy as shown in FIG. 3. This memory module is organized as a circular queue of data blocks (see data block 0, block 1, data block 2, data block N in FIG. 3), each of which corresponds to a complete video line. Each data block contains pointers (PIM ROW#, C_SYNC ROW #) to the respective row entries in the PIM module 28 and DHV memory module 32 (see FIG. 3). This control structure is very flexible in that the components of the video signal are defined line by line.

A master frame controller or DOM controller 26 is coupled to the VSM 34, receiving and providing signals thereto, described below. The DOM controller 26 is also coupled to the LPM module 40 receiving and providing signals thereto, described below. The DOM controller 26 is also coupled to the PIM and DOM modules 28, 30 and provides signals thereto, described below. Finally, the DOM controller 26 is coupled to the DHV memory module 32 directly and through a register 36.

A frame of video is created line by line. In a preferred embodiment, for each line, the DVI generator 17 reads the LPM module 40 and extracts the pointers from the data block for the current line. This takes place during the time after the previous line has finished and before the current line begins. The extracted pointers determine which row is active in each of the memories. The overall timing of the line is controlled by four counters 42, 44, 46, 48—see FIG. 4 for a block diagram. A line length counter 42 determines the total length of the line, and receives data from a line length pre load data register 41. A video delay counter 44 determines when the active video begins in a line, and receives data from a video delay pre load data register 43. Note the video delay counter supports zero delay.

Figure 4:
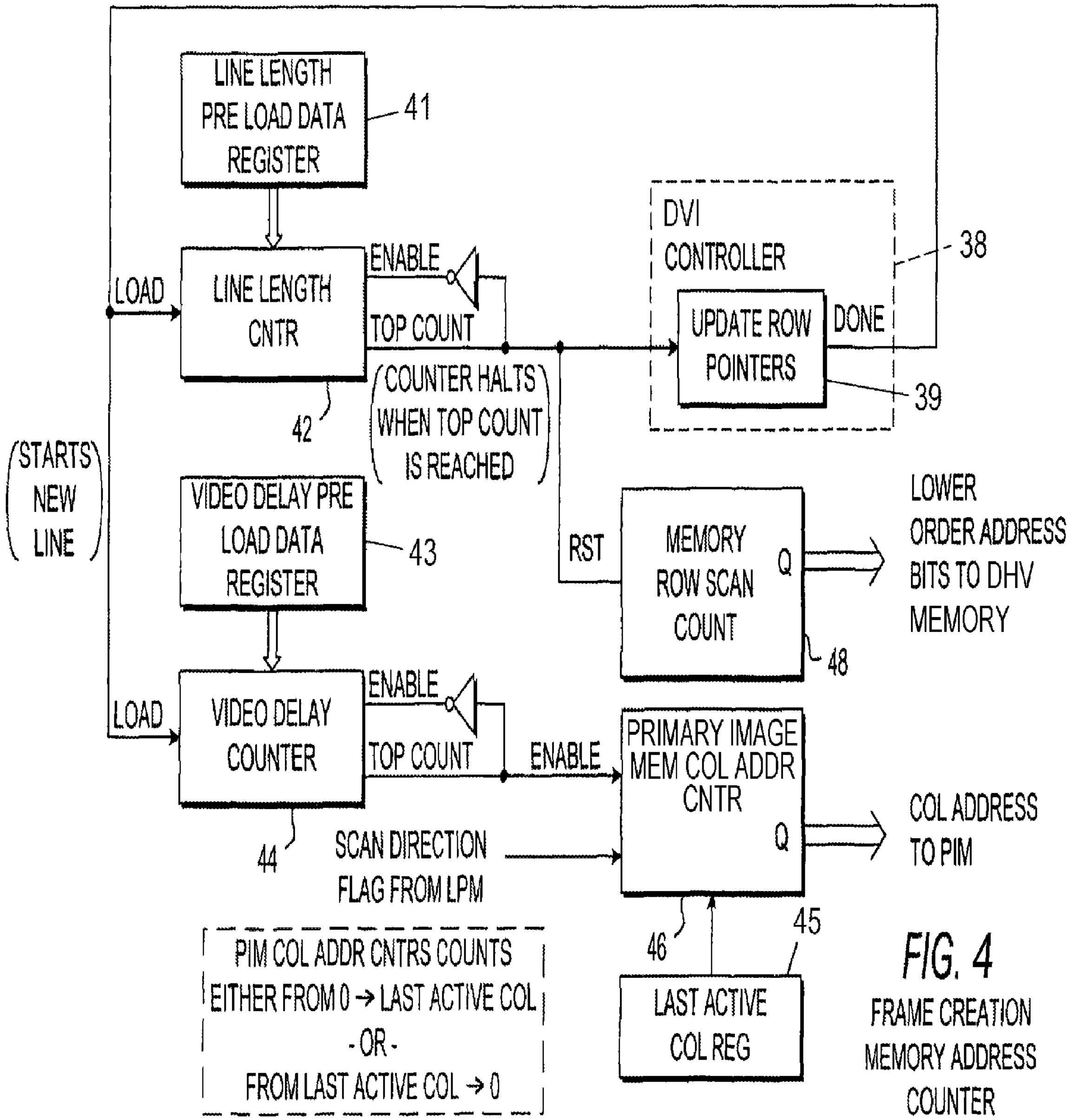
FIG. 4 is a block diagram of the manner in which a new line is created in the DVI video signal generator in the invention.

The PIM column counter 46 determines which column is to be read from the PIM 28 (see column address to PIM output in FIG. 4). A scan direction flag from the LPM module 40 is provided to the PIM column counter 46. The PIM column counter 46 receives an enable signal from the video delay counter 44 and data from a last active column register 45. A static memory row scan counter 48 provides the lower order address for the DHV memory module 32 (see Lower order address bits to DHV memory output in FIG. 4).

By convention, a video line begins with the leading edge of the horizontal sync pulse. At the beginning of the line, the line length, video delay and the static memory scan counters 42, 44, 48 start (see "starts new line" and "load" indicators in FIG. 4 originating from the update row pointer 39 of the DVI controller 38). When the video delay counter 44 reaches terminal count, the PIM column counter 46 starts. The PIM column counters 46 counts from zero up to maximum value. As the memories are scanned, a 32 bit wide data stream is produced—16 bits from the PIM 28 (2 pixels), and 8 bits from the DHV memory module 32. The data stream is then converted into a 16 bit wide stream at twice the clock rate at which the memories were read (see FIG. 3, 2:1½ width 2 speed merge). Each entry in this stream represents two pixels times of data.

These functions occur in a video stream assembler 37. Video stream assembler 37 receives a clock signal from a fixed oscillator, and data from the PIM module 28, DOM module 30, DHV memory module 32 and master frame (DOM) controller 26. From the received data, the video stream assembler 37 provides data-in and write information to the line buffer memory 70, and data to the master frame (DOM) controller 26.

Figure 2:
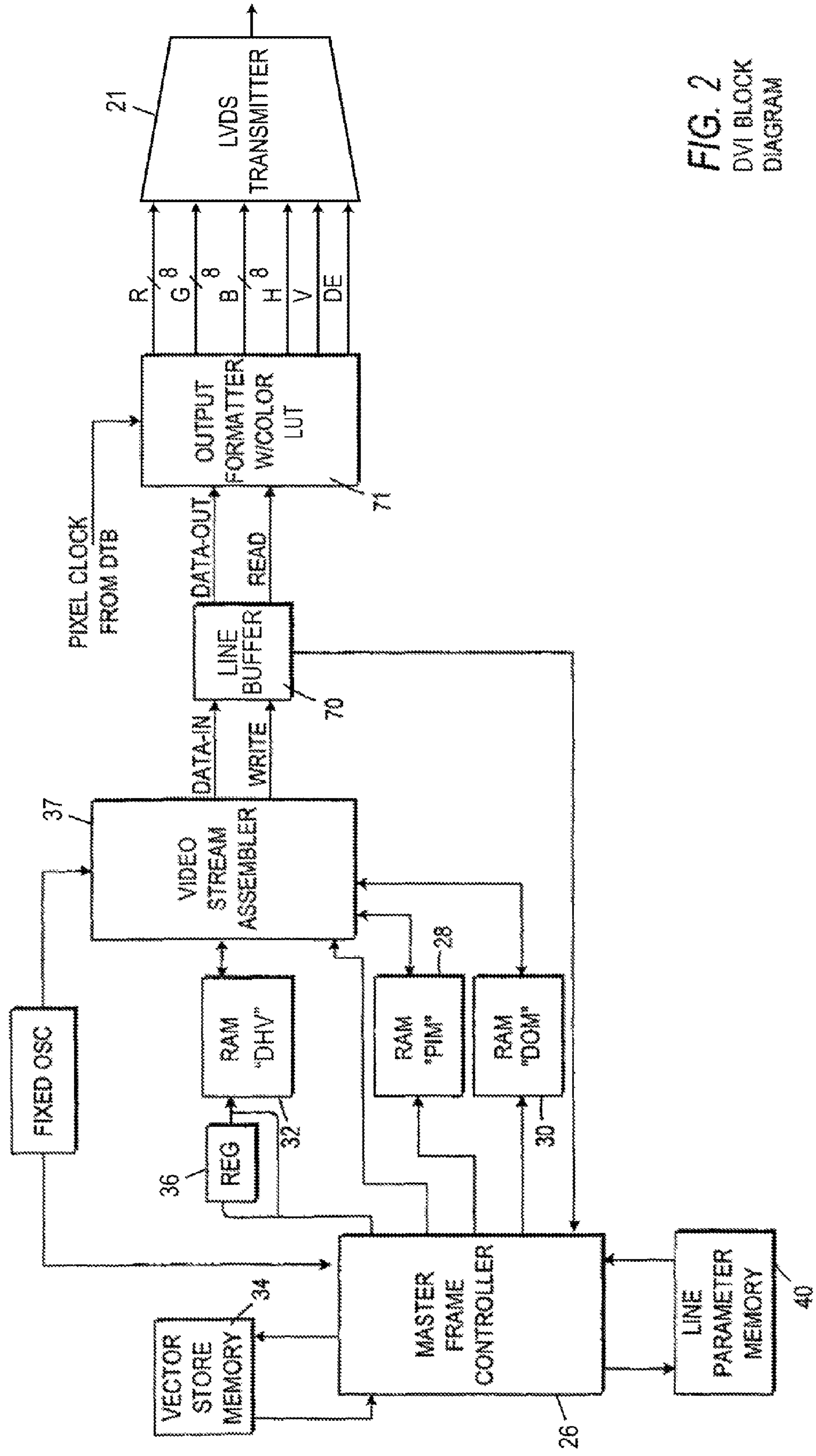
FIG. 2 shows the overall hierarchy of the DVI video generation element of a video asset in accordance with the invention.

Lastly, the data is written into a line buffer memory 70 that separates the non-real time portion from the real time portion (see FIG. 2). Note that with this control structure, scan formats such as interlaced and non-interlaced, are established entirely by the order of the PIM row pointers. Additionally, since a pointer to the DHV memory module 32 is in each data block, any DHV line pattern can be associated with any line of image.

Figure 6:
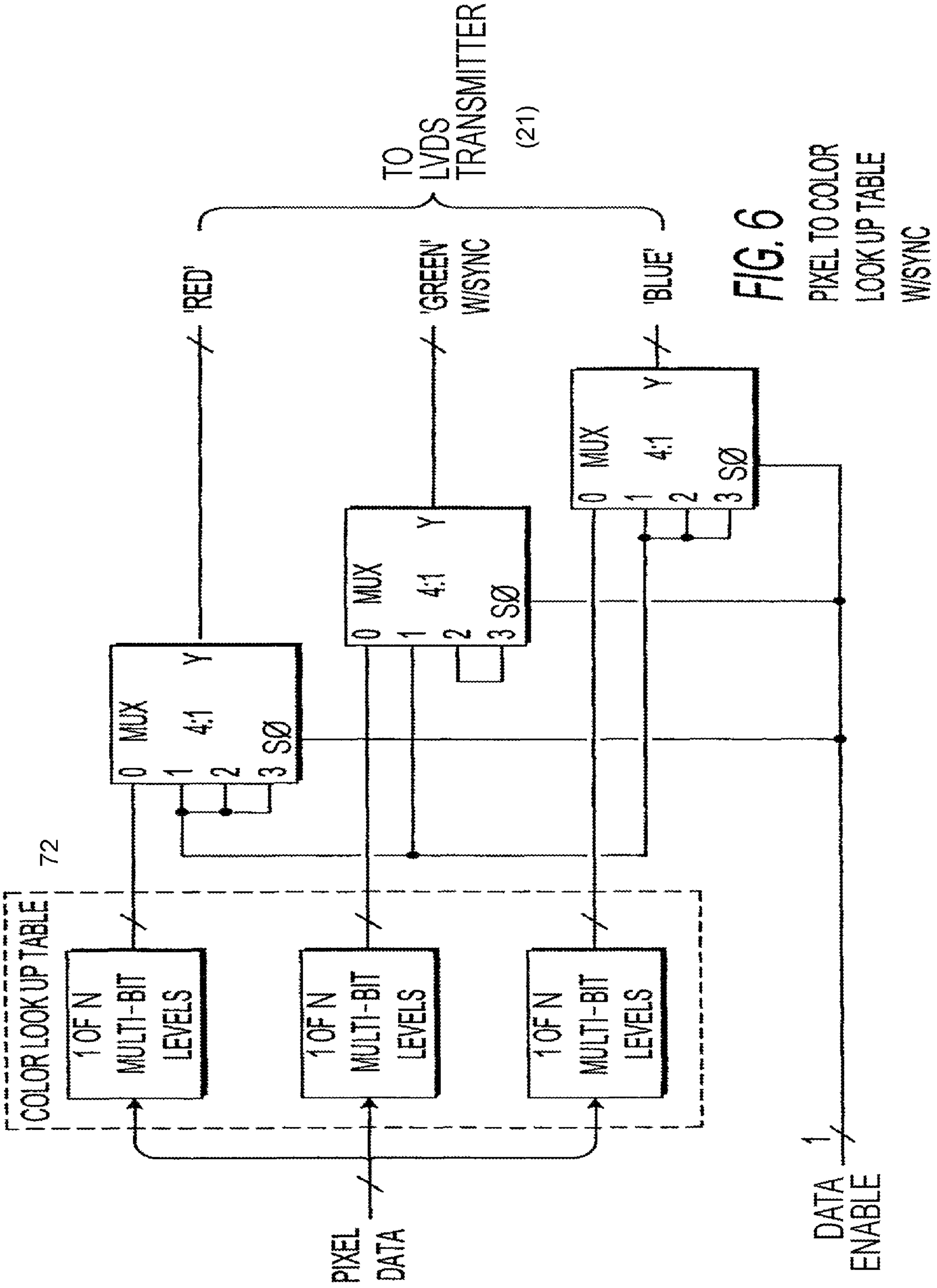
FIG. 6 is a schematic diagram of a pixel-to-color look-up table with sync for use in the video asset in accordance with the invention.

An output formatter 71 takes the image stream from the line buffer memory 70 (Data-out and Read lines); receives a pixel clock from the distributed time base (DTB) 126 (see FIG. 8), calculates the R-G-B byte representation for each pixel using the internal color lookup table (LUT) 72, as shown in FIG. 6, when DE is active low; constructs the horizontal sync (H), vertical sync (V) and data enable (DE) signals for the present video line and feeds those signals into the final stage, a low voltage differential signaling (LVDS) transmitter 21. The output formatter 71 includes three multiplexers, one for each color. The LVDS transmitter 21 is responsible for converting the supplied video signals into low voltage differential signal pairs for external transmission. Thus, eight output channels of each color are provided.

The video asset 10 has the capability and functionality to superimpose a dynamic image over the primary, static image. The dynamic overlay images, one or more of which may be superimposed over each primary, static image, and their associated list of offsets are stored in the DOM module 30. For each overlay image in the DOM module 30, a memory space, or template, is allocated. The template size is specified as 'V' lines by 'H' pixels. Activation and merging of the overlay image is accomplished by the DOM controller 26.

Figure 5:
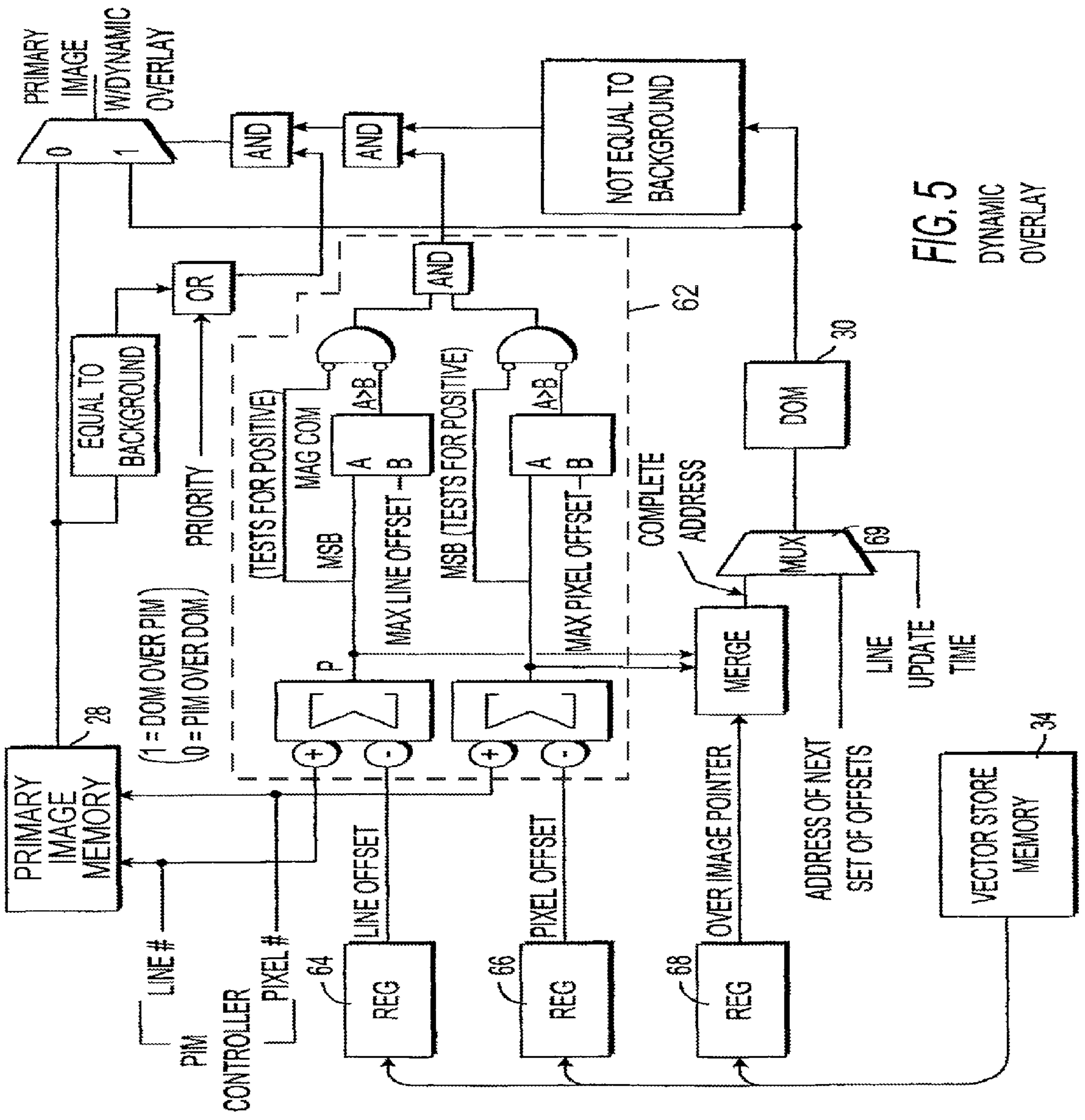
FIG. 5 is a schematic drawing of the dynamic overlay for use in the video asset in accordance with the invention.

Referring to FIG. 2, during the line update interval, the DOM controller 26 reads the next offset entry from the Vector Store Memory (VSM) module 34. Each entry in the VSM module 34 holds four data items; line offset loaded into register 64, pixel offset loaded into register 66, overlay image pointer loaded into register 68, and priority (see FIG. 5). A controller 62 compares the overlay line offset to the pending line of the primary image. If the pending primary image line falls between the line offset and the line offset plus the template line size, i.e., overlay line offset<=pending primary line<=overlay line offset +'V', then the overlay image will be active during the pending line. If not, the overlay image will not be active during the pending line and no further activity takes place until the next primary line update. There are several different ways to configure the controller 62 to achieve these functions, and the structure shown in FIG. 5 is exemplifying only and not limiting.

When the overlay image is active during pending primary line, the overlay image line to be accessed is the primary pending line minus the overlay line offset. During the actual scan of the primary image line, the pixel address is continuously compared with the overlay pixel offset. When the primary pixel address falls on or between the overlay pixel offset and the overlay pixel offset plus 'H', the scan shifts from the primary image to dynamic overlay image. However, if the current overlay image pixel value is the background value and the priority bit is set to DOM over PIM, a hardware mux 69 selects the primary pixel instead of the overlay pixel (see FIG. 5). This makes the background 'color' of the overlay image transparent so that overlay image can be seen over the primary image, but not shape of overlay template.

If the priority bit is set to PIM over DOM, the active pixels of the overlay are selected only during the primary image background color. This puts the overlay image underneath the primary. When scanning the dynamic overlay image line, the overlay pixel address is equal to the primary pixel address minus the overlay pixel offset. This method of the transferring scan from the primary to the overlay memory is independent of the scan direction either vertically or horizontally. To complete the DOM address field when accessing the template stored image, the overlay image pointer loaded into register 68 points to a pair of registers in the controller which contain the template horizontal and vertical offsets within the DOM module 30. These offsets are hardware added to the template line and pixel address to form the complete DOM address. This is also how individual templates are selected.

DVI Real Time Capture or Acquisition (19)

Accordingly, to achieve at least one of the objects above, a method for capturing and automatically formatting DVI video signals, in accordance with the invention, comprises providing a single real-time capture module including a DVI LVDS receiver for accepting the DVI video signals, and three memories, storing the data from the input channels relating to the video signals in the three memories, generating a line location look-up table during the storage of data in the memories which holds the starting address of the stored lines of synchronized video.

Figure 7:
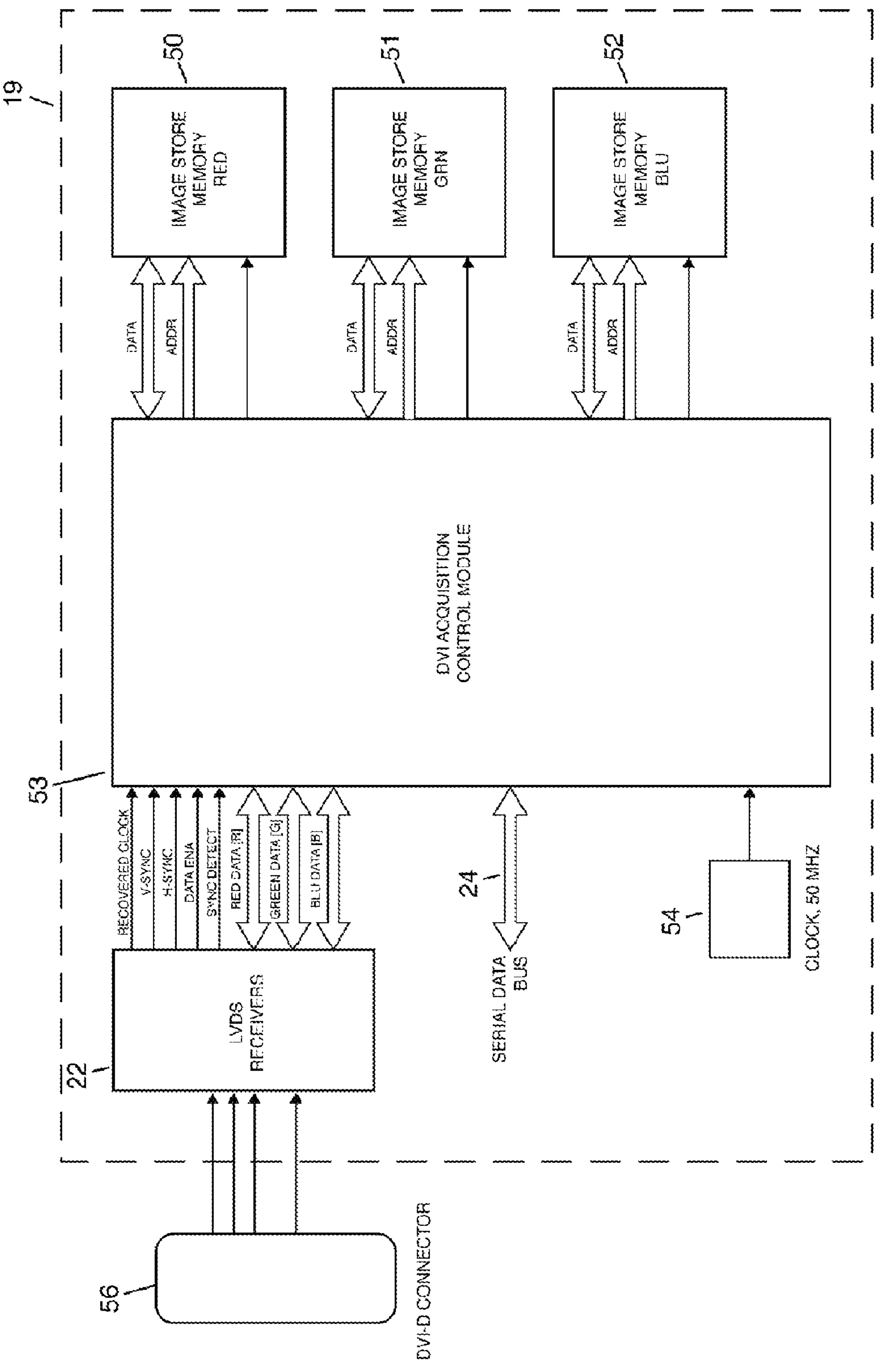
FIG. 7 is a schematic diagram of the real time capture element for use in the video asset in accordance with the invention.

The general arrangement of the DVI real time capture or acquisition module 19 is shown in FIG. 7. The function of the DVI real time capture module 19 is to perform one-shot full frame video image on any DVI video format independently from the DVI generator 17.

Referring now to FIG. 7, with respect to the LVDS receiver 23 and the DVI Acquisition control module 53, DVI LVDS signals are input from DVI receiver 23 on a DVI-D connector 56 and are decoded by the LVDS receiver 23 into discrete constituent signals, namely, V sync, H sync, Data Enable (Data Ena), Sync Detect, recovered clock, red data, green data and blue data. The DVI Acquisition control module 53 automatically analyzes the discrete signals by determining the timing parameters of the discrete signals using internal counters clocked by oscillator 54, and then places those values into internal registers for evaluation by the controlling software. The V sync triggers a single pulse generator which places its value into a software-accessible register indicating the presence of an active video signal when the register is a logic 'high' level. Although mention is made of a single LVDS receiver, there may be a plurality of such receivers as indicated in FIG. 7. Similarly, although mention is made of a single DVI-D connector 56, there may be a plurality of such connectors each providing signals to single LVDS receiver, to a respective one of a plurality of LVDS receivers or to a plurality of receivers. Oscillator may operate at 50 MHz as shown in FIG. 7 or another frequency, which could be readily determined by one skilled in the art in view of the disclosure herein.

Once triggered for video image acquisition, the DVI Acquisition Control Module 53 waits for the top of the next video frame to occur, as denoted by the V-Sync signal from the LVDS receiver 23. Once triggered, the DVI Acquisition Control Module 53 stores the red, green and blue data within the respective image store memory 50, 51, 52 and stores the data enable, H Sync and V Sync data in a separate memory, called the Tag Memory (not specifically indicated in FIG. 7 but which may be part of the DVI acquisition control module 53 or a separate component electrically coupled thereto). When subsequent H Syncs are detected, which signify the start of the next video line, the RGB data shared memory pointer is incremented to the start of the next memory block (that is assigned to the next video line) and the process repeats. The organization of the video lines within the memory facilitates efficient read back by the controlling software by retaining the image format throughout the capture process. Upon detection of the next V sync, the process stops and a status bit indicates to the controlling software that the frame capture is complete.

The memory may be configured as an array in which each row corresponds to a single line of synchronized video and each column corresponds to a video sample.

The connection of the DVI acquisition control module 53 to the serial data interface 24 enables data flow from other components directly thereto and therefrom.

Figure 8:
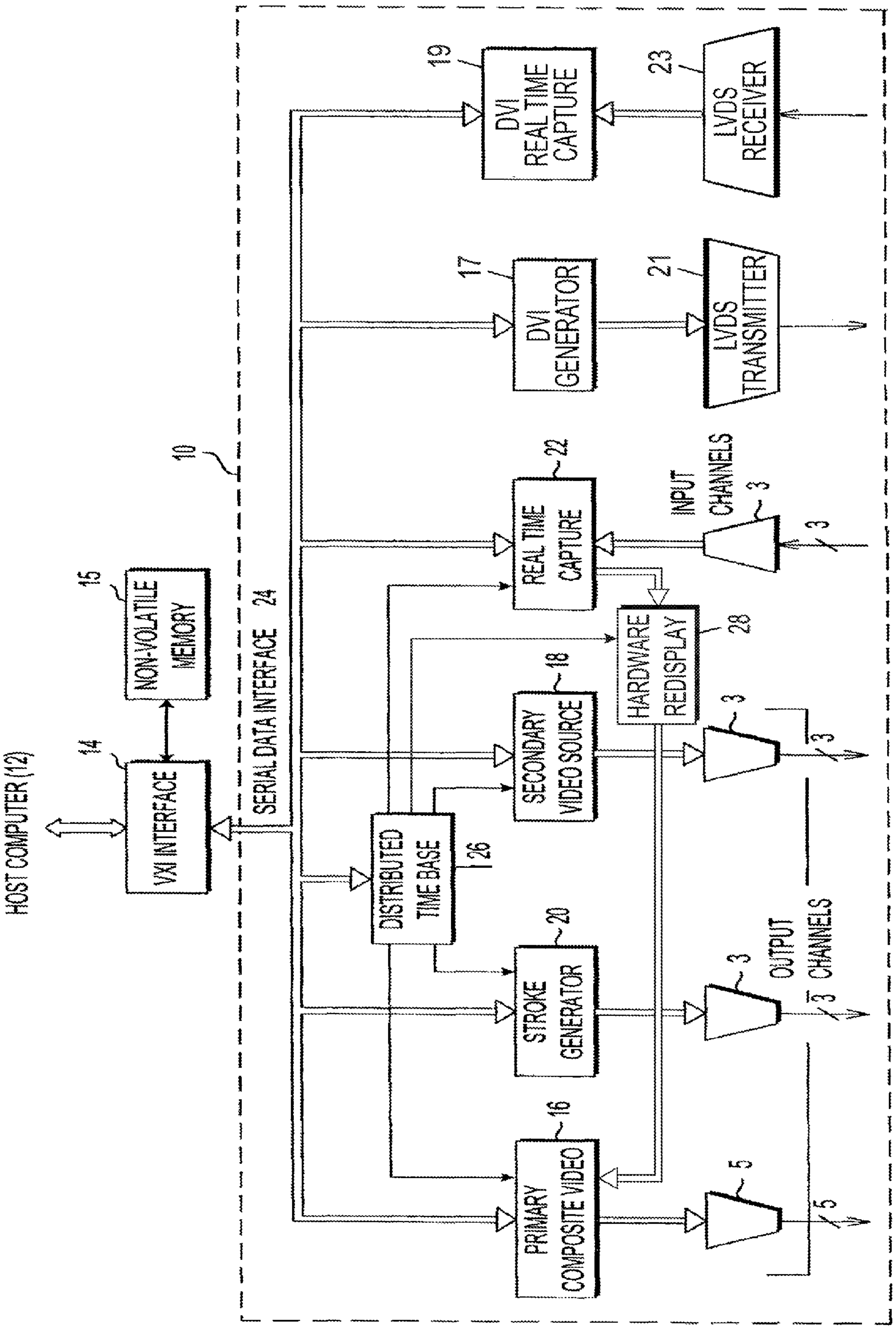
FIG. 8 shows a preferred embodiment of an arrangement of the video asset in accordance with the invention.

Referring now to FIG. 8, with reference to the '536 patent, a video asset (PVGA) comprises several major elements including a primary composite video generator (PVG), stroke generator (SG), secondary video source (SVS), and real time capture (RTC), see col. 4, lines 5-8. The real time capture module already provides video data acquisition functions and makes the captured data available to external processes for analysis. More specifically, FIG. 8 herein is similar to FIG. 1 of the '536 patent and shows the general arrangement of the video asset which is designated generally as 10. A VXI Interface 14 is the interface between the video asset 10 and an automatic test equipment (ATE) host computer 12. Each of the primary elements, the primary composite video generator (PVG) 16, secondary video source (SVS) 18, stroke generator (SG) 20 and real time capture (RTC) 22, communicates with the VXI Interface 14 via the Serial Data Interface (SDI) 24. As to a distributed timebase, clock generation and distribution are the functions of DTB 126. The DTB 126 preferably includes a common high precision crystal oscillator which provides the reference frequency for a series of 4 high resolution frequency synthesizers individually dedicated to the PVG 16, SVS 18, SG 20 and RTC 22. Non-volatile memory 15 is used to store calculated timing variations for use in processing synchronized video. The primary composite video generator 16 is configured and programmed to accept the video signal from a redisplay module 27 and, if required by the particular embodiment, perform color space conversion. Additional capabilities and functionality of the redisplay module are set forth in U.S. patent application Ser. No. 13/238,588, which is incorporated by reference herein.

With respect to input/output channels, the video asset 10 has a series of video bandwidth input and output channels. The RTC 22 preferably has three input channels that can handle up to +/−10 volt input. These channels utilize voltage-controlled gain and offset circuits to set the channel's operational parameters. The transfer characteristics of the channels are sensed by means of high-resolution analog to digital converters (ADCs). Precision control digital to analog converters (DACs) provide the necessary control voltages. A software driver resident in the host computer 12 reads the sense ADCs, calculates the necessary control voltages and writes them to the control DACs to achieve the desired characteristics. This arrangement permits the channels to be aligned at the time of use to parameters called for in the test program set (TPS) program. Since the channels are accurately aligned at run time, all long-term drift errors are eliminated. The PVG 16 has three +/−3 volt output channels and two +/−10 volt output channels. The SVS 18 has three +/−3 volt output channels. The SG 20 has three +/−10 volt output channels. (Note: rated voltages are into a 75 Ohm load.) All output channels of similar voltage are identical and feature the same sense and control capability as for the input channels. Since all the sense ADCs and control DACs have a serial interface, communication with them is achieved via the SDI 24.

FIG. 8 also shows the DVI generator 17 and DVI transmitter 21 (also referred to as an LVDS transmitter), and DVI real time capture module 19 and DVI receiver 23 (also referred to as an LVDS receiver). The DVI generator 17 and DVI real time capture module 19 are coupled to the VXI interface 14 via the serial data interface 24.

Above, some preferred embodiments of the invention have been described, and it is obvious to a person skilled in the art that numerous modifications can be made to these embodiments within the scope of the inventive idea defined in the accompanying patent claims. As such, the examples provided above are not meant to be exclusive. Many other variations of the present invention would be obvious to those skilled in the art, and are contemplated to be within the scope of the appended claims.

We claim:

1. A method for capturing and automatically formatting at least two different formats of video signals including digital video interface (DVI) video signals, comprising:

providing a first real time capture module including at least three input channels for receiving video signals;

providing a second real time capture module including at least three input channels for receiving the DVI video signals, and a corresponding number of color-specific memories, the at least three input channels of the second real time capture module being different than the at least three input channels of the first real time capture module;

enabling, using at least one video generating module, video signals to be generated and the generated video signals to be output via a first plurality of output channels; and enabling DVI video signals to be generated and the generated DVI video signals to be output via a second plurality of output channels different than the first plurality of output channels by detecting presence of a DVI signal by using a vertical sync pulse to trigger a timed pulse indicative of vertical sync presence;

storing captured DVI data relating to the video signals in separate ones of the color-specific memories;

automatically measuring parameters of the DVI signal including duration of an active image area on a video line, a total pixels per line, a total line time, a frame time, and a pixel clock frequency; and directing the parameters into data registers to enable retrieval and subsequent formatting of the DVI video signals.

2. The method of claim 1, further comprising configuring each of the color-specific memories as a two dimensional array in which each row corresponds to a single line of synchronized video and each column corresponds to a video sample.

3. The method of claim 1, further comprising storing the horizontal signal, the vertical signal and the data enable signal in a memory separate from the color-specific memories.

4. The method of claim 1, further comprising:

detecting a horizontal sync indicative of start of a new line; then incrementing an RGB data shared memory pointer to a start of the next memory block is assigned to the next video line; and repeating the process for each new line.

5. The method of claim 1, wherein the steps of enabling video signals to be generated and the generated video signals to be output via the first and second pluralities of output channels comprises enabling video signals to be generated and the generated video signals to be output via the first plurality of output channels simultaneous with the generation and output of the generated DVI video signals via the second plurality of output channels.

6. The method of claim 1, wherein the at least one video generating module comprises a primary composite video generating module or a stroke video generating module.

7. The method of claim 1, further comprising:

receiving video signals via the at least three input channels of the first real time capture module; and simultaneously receiving video signals via the at least three input channels of the second real time capture module.

8. The method of claim 7, further comprising:

generating video signals using the at least one video generating module; and simultaneously generating DVI video signals.

9. The method of claim 1, wherein the step of enabling DVI video signals to be generated and the generated DVI video signals to be output via the second plurality of output channels comprises providing a DVI generator module.

10. The method of claim 9, further comprising arranging the second real time capture module and the DVI generator module on a board that is removably attachable to a board on which the at least one video generating module and the first real time capture module are arranged.

11. A video processor, comprising:

a host computer including a monitor;

a video asset coupled to said computer for generating video signals; and an interface for connecting said video asset to said computer to enable the display of the video signals on said monitor, said video asset comprising a plurality of primary elements including:

a primary composite video module for producing different types of a primary video signal and outputting the primary video signal via output channels, a secondary composite video source module for producing a secondary composite video signal and outputting the secondary composite video signal via output channels, said secondary video source module being arranged to produce the secondary composite video signal in an identical or different format than the primary video signal and different than the primary video signal, a stroke generator module for generating a stroke XYZ video signal and outputting the stroke video signal via output channels, a digital video interface (DVI) generation module for producing different types of DVI video signals and outputting the DVI video signals via output channels different than the output channels associated with said primary composite video module, said secondary composite video source module and said stroke generator module, a first real time capture module for capturing video signals in a plurality of different modes including composite, stroke and raster video, and a second real time capture module for capturing DVI video signals, and a common distributed time base module for generating and distributing clock signals to all of said primary elements, said primary elements being autonomous or autonomously operational such that each of said primary elements does not share components with other of said primary elements aside from said interface and said distributed time base module to thereby enable each of said primary elements to act as a stand-alone instrument and all of said primary elements to act simultaneously.

12. The processor of claim 11, wherein said video asset is a single instrument adapted for insertion into a single slot of said host computer.

13. The processor of claim 11, wherein at least one of said first and second real time capture modules is configured to read back a captured, fully formatted image for analysis or redisplay.

14. The processor of claim 11, further comprising a serial data interface for connecting each of said primary elements together and to said interface.

15. The processor of claim 11, wherein said second real time capture module and said DVI generation module physically exist within the same instrument.

16. The processor of claim 11, wherein said second real time capture module and said DVI generation module physically exist within separate instruments that are utilized together.

17. The processor of claim 11, wherein said second real time capture module and said DVI generation module are arranged on a daughterboard attached to the video asset, or arranged in a separate independent instrument.

18. The processor of claim 11, wherein said first and second real time capture modules each include at least three input channels for capturing video signals.

19. The processor of claim 11, wherein said first and second real time capture modules are configured to capture video signals simultaneously.

20. The processor of claim 11, wherein said DVI generation module is configured to produce DVI video signals simultaneously with at least one of production of the primary video signal by said primary composite video module, production of the secondary composite video signal by said secondary composite video signal, and generation of the stroke XYZ video signal by said stroke generator module.

* * * * *